(12) United States Patent
Blanco et al.

(10) Patent No.: US 9,467,664 B2
(45) Date of Patent: Oct. 11, 2016

(54) METHOD OF AND SYSTEM FOR CONDUCTING MOBILE VIDEO/AUDIO SURVEILLANCE IN COMPLIANCE WITH PRIVACY RIGHTS

(71) Applicant: MOTOROLA SOLUTIONS, INC, Schaumburg, IL (US)

(72) Inventors: Alejandro G Blanco, Fort Lauderdale, FL (US); Thomas D Gross, Miami, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 577 days.

(21) Appl. No.: 14/035,263

(22) Filed: Sep. 24, 2013

(65) Prior Publication Data

US 2016/0219252 A1    Jul. 28, 2016

(51) Int. Cl.
*H04N 7/18* (2006.01)
*G05B 19/048* (2006.01)

(52) U.S. Cl.
CPC ............ *H04N 7/185* (2013.01); *G05B 19/048* (2013.01)

(58) Field of Classification Search
None
See application file for complete search history.

(56) References Cited

U.S. PATENT DOCUMENTS

| | | |
|---|---|---|
| 6,894,717 B2 | 5/2005 | Bakewell |
| 8,311,275 B1 | 11/2012 | Berlie et al. |
| 8,346,578 B1 | 1/2013 | Hopkins, III |
| 2010/0141503 A1* | 6/2010 | Baumatz ............... G01S 7/48 342/27 |
| 2012/0150966 A1 | 6/2012 | Fan et al. |
| 2013/0021433 A1 | 1/2013 | Belsarkar |
| 2013/0119188 A1 | 5/2013 | Clampa et al. |
| 2014/0018979 A1* | 1/2014 | Goossen ............ G08G 5/0034 701/3 |
| 2014/0118483 A1* | 5/2014 | Rapoport ........... H04N 5/23258 348/36 |
| 2015/0347872 A1* | 12/2015 | Taylor .................. G06T 7/0075 382/224 |

FOREIGN PATENT DOCUMENTS

| | | |
|---|---|---|
| EP | 1914991 A2 | 4/2008 |
| WO | 2009095106 A1 | 8/2009 |
| WO | 2012054299 A1 | 4/2012 |
| WO | 2013137534 A1 | 9/2013 |

OTHER PUBLICATIONS

PCT International Search Report Dated Dec. 19, 2014 for Counterpart Application PCT/US2014/052268.

* cited by examiner

*Primary Examiner* — Sath V Perungavoor
*Assistant Examiner* — Janese Duley

(57) ABSTRACT

A video/audio recording device is mounted on a mobile support for recording surveillance information. The recording device is movable relative to the mobile support to adjustably position the recording device to face the target along a line-of-sight during recording. A database stores public map spaces, private map spaces, and warrant spaces that exist in a geographic area to be surveilled. A programmed controller accesses the database, determines whether the target is recordable from a public map space along the line-of-sight between the recording device and the target and/or whether the target is covered by a warrant space, and controls the recording device to record the surveillance information upon a successful determination that the target is so recordable or so covered.

19 Claims, 3 Drawing Sheets

METHOD OF AND SYSTEM FOR CONDUCTING MOBILE VIDEO/AUDIO SURVEILLANCE IN COMPLIANCE WITH PRIVACY RIGHTS

FIELD OF THE DISCLOSURE

The present disclosure relates generally to a method of, and a system for, conducting surveillance of a target, and, more particularly, to conducting mobile video/audio surveillance in compliance with an individual's legal right of privacy.

BACKGROUND

Surveillance is the monitoring of the behavior, activities, or other changing information, usually of people for the purpose of influencing, managing, directing, or protecting them. This can include observation from a distance by means of electronic equipment, such as closed circuit television (CCTV) cameras, or hearing from a distance by means of microphones with high sensitivity. Monitoring and recording such observations/hearings is very useful to governments and law enforcement to maintain social control, recognize and monitor threats, and prevent/investigate criminal activity. Mobile video/audio surveillance systems, which are mounted on vehicles that travel by air, such as flying drones or unmanned aerial vehicles (UAVs) and like aircraft, or on vehicles that travel on land, such as cars, vans, trucks, motorcycles, bicycles, robots, and the like, or on vehicles that travel by water, such as boats and like watercraft, or on body harnesses worn by human personnel, enable governments to possess an unprecedented ability to monitor and record surveillance information.

However, many civil rights and privacy groups have long expressed the concern that by allowing continual increases in governmental surveillance of its citizens, a mass surveillance society, with extremely limited, or non-existent, political and/or personal freedoms, will result. As the ever-increasing utility of such mobile video/audio surveillance systems has evolved and resulted in more frequent arrests by law enforcement, the use of such surveillance systems has been challenged as an infringement of an individual's constitutional right of privacy. Although legal safeguards for conducting a surveillance operation have been proposed, they are often interpreted differently in different jurisdictions. The last thing a law enforcement agency wants to do is to invest significant man-hours and resources into an investigation and conviction, and then to have the case overturned on appeal in court for failure to observe the legal safeguards as interpreted by that jurisdiction.

Accordingly, there is a need to assist governmental agencies in conducting video/audio surveillance in a legal, constitutionally-approved manner by insuring that the mobile video/audio surveillance systems cannot be operated in an illegal manner.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
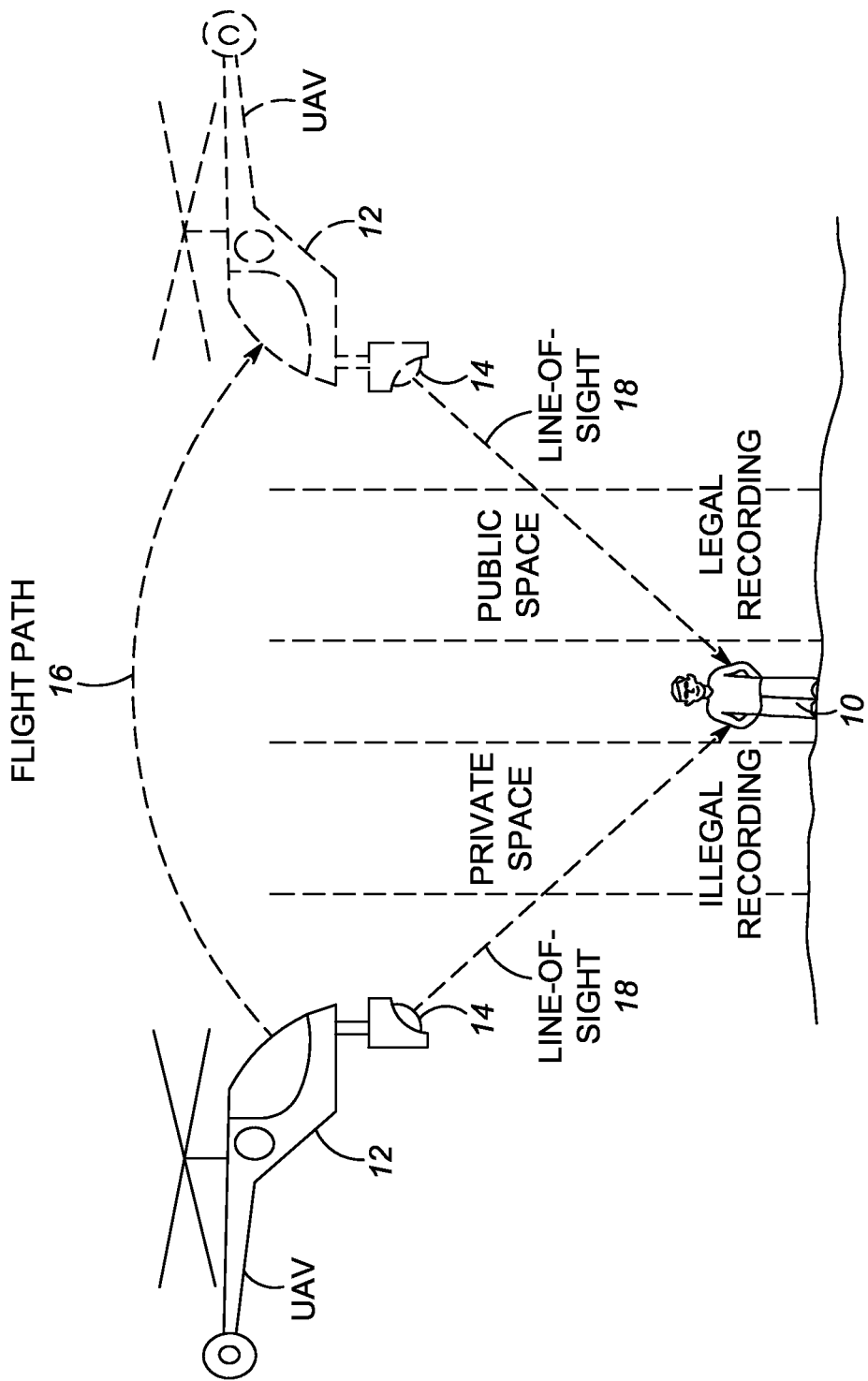
FIG. 1 is a pictorial view of a mobile video/audio surveillance system for conducting surveillance in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a system for conducting surveillance of a target. The system includes a mobile support, e.g., a vehicle than can travel by air, land, or water, or a body harness, movable relative to the target over a geographic area, and a recording device, e.g., a camera and/or a microphone, mounted on the support for recording surveillance information. The recording device is positioned to face the target along a line-of-sight during recording. Advantageously, a drive is operative for moving the recording device relative to the mobile support to adjustably position the recording device to face the target along the line-of-sight during recording.

The system further includes a database for storing different types of public map spaces and private map spaces that exist in the geographic area, and a programmed controller for accessing the database. Advantageously, the database can also store warrant spaces that can be surveilled. The controller is operative for determining whether the target is viewable/hearable/recordable from a public map space along the line-of-sight between the recording device and the target, and for controlling the recording device to record the surveillance information upon a successful determination that the target is so viewable/hearable/recordable. Put another way, the line-of-sight between the public map space and the target is clear, i.e., there is no private map space adjacent the target along the line-of-sight. The controller is also operative for determining whether a warrant space covers the target, and for controlling the recording device to record the surveillance information upon a successful determination that the target is so covered.

As interpreted by most jurisdictions, a surveillance complies with an individual's privacy rights when the target is observable/hearable/recordable from a public map space, or is covered by a warrant space. The controller is also operative for automatically disabling the recording device upon an unsuccessful determination that the target is so viewable/hearable/recordable or so covered, thereby automatically preventing any illegal recording or violation of one's privacy rights. In a preferred embodiment, the controller is also operative for storing the recorded surveillance information, as well as for storing verification data verifying that the target was indeed viewable/hearable/recordable from a public space along a clear line-of-sight, or that the target was indeed covered by a warrant, during recording. In the event that the target was only viewable/hearable/recordable from a private map space along the line-of-sight (and, therefore, an attempted recording is illegal), then the system further includes steering controls for steering the mobile support to move through the geographic area to a position in which the target is viewable/hearable/recordable from a public space along a clear line-of-sight between the recording device and the target, in which case, a recording is now legal and permitted.

A method, in accordance with another aspect of this disclosure, of conducting surveillance of a target is performed by moving a mobile support relative to the target over a geographic area, by recording surveillance information with a recording device positioned to face the target along a line-of-sight during recording, by storing public map spaces and private map spaces that exist in the geographic area in a database, by determining whether the target is viewable/hearable/recordable from a public map space along the line-of-sight between the recording device and the target by accessing the database, and by controlling the recording device to record the surveillance information upon a successful determination that the target is so viewable/hearable/recordable.

Turning now to FIG. 1 of the drawings, a system for conducting surveillance of a target 10 includes a mobile support 12. As illustrated, the target 10 is a person whose behavior and activities are considered suspicious, although the target can also be an inanimate object. The support 12 is depicted in FIG. 1 as a flying drone or unmanned aerial vehicle (UAV), or like aircraft. It will be understood that the mobile support 12 can also be any vehicle than can travel by land, such as cars, vans, trucks, motorcycles, bicycles, robots, or the like, or any vehicle that can travel by water, such as boats, or like watercraft. The mobile support 12 can also be a body harnesses worn by human personnel, such as police officers.

The mobile support 12 is movable relative to the target 10 over a geographic area, that can comprise, as detailed below, public map spaces, private map spaces, and warrant spaces. For example, as shown in FIG. 1, the UAV 12 can be steered to fly along a flight path 16 by a steering control 20 (see FIG. 2). The steering control 20 may be remotely operated by an off-board, manual control 22, or locally operated by an on-board computer control 24.

A recording device 14, e.g., a camera and/or a microphone, is mounted on the support 12 for recording surveillance information. The recording device 14 is positioned to face the target 10 along a line-of-sight 18 during recording. A recording device drive 26 is operative for moving the recording device 14 relative to the mobile support 12 to adjustably position the recording device 14 to face the target 10 along the line-of-sight 18 during recording. The recording device drive 26 may be remotely operated by the off-board, manual control 22, or locally operated by the on-board computer control 24. The recording device drive 26 may include pan, tilt, and zoom functions.

Figure 2:
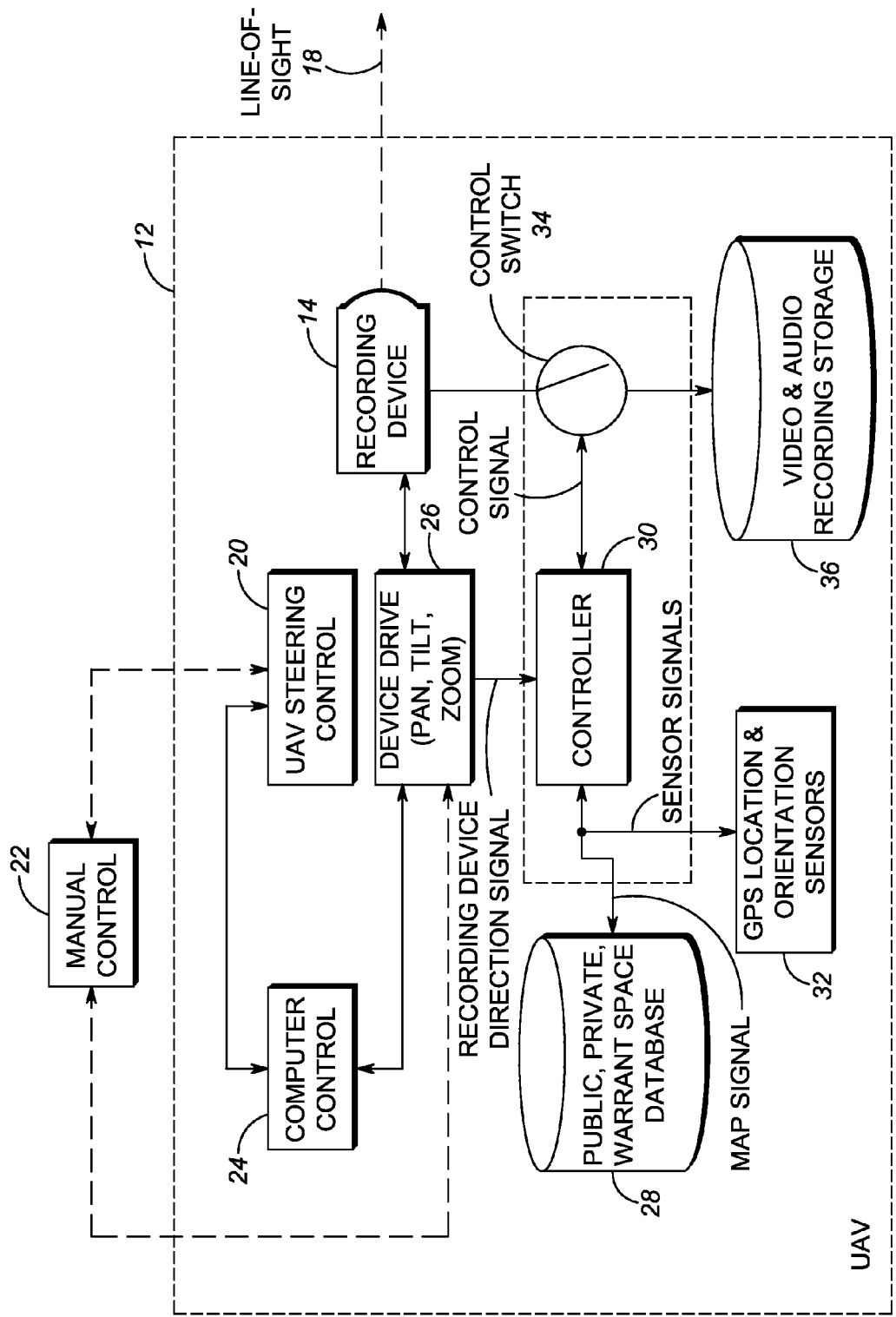
FIG. 2 is a schematic block diagram, wherein components of the system of FIG. 1 are set forth.

As depicted in FIG. 2, a database 28 on the support 12 stores map data concerning the geographic area under surveillance. The map data includes public map spaces that are accessible to the public, e.g., parks, highways, public squares and arenas, etc., and from which recordings are legally permitted. The map data also includes private map spaces that are not accessible to the public, e.g., private properties and residences, and from which recordings are not legally permitted, absent a warrant or writ duly issued by a competent officer of a court, such as a judge or magistrate. The database 28 also stores warrant spaces in which recordings are legally permitted in view of such a duly issued warrant. As interpreted by most jurisdictions, a surveillance complies with an individual's privacy rights when the target 10 is observable/hearable/recordable from a public space, or is covered by a warrant space, but is not in compliance with such privacy rights when the target 10 is not observable/hearable/recordable from a public space.

As further depicted in FIG. 2, a programmed controller 30 on the support 12 is operative for accessing the database 28. The controller 30 is operative for determining whether the target 10 is viewable/hearable/recordable from a public map space along the line-of-sight 18 between the recording device 14 and the target 10, and/or for determining whether the target 10 is covered by a warrant space. The controller 30 is operative for controlling the recording device 14 to record the surveillance information when the controller 30 determines that the target 10 is so viewable/hearable/recordable, or determines that the target 10 is so covered, and for automatically disabling the recording device 14 when the controller 30 determines that the target 10 is not so viewable/hearable/recordable, or determines that the target 10 is not so covered.

To make these determinations, in addition to accessing the database 28 to obtain a map signal with map information, the controller 30 accesses GPS location and orientation sensors 32, such as gyroscopes, accelerometers, magnetometers, altimeters, and like sensors, on-board the support 12 to obtain sensor signals, and also accesses the device drive 26 to obtain a recording device direction signal to obtain the direction of the line-of-sight 18. The controller 30 generates an output control signal to switch a control switch 34 between a closed state in which recording by the recording device 14 is permitted and is stored in a storage or memory component 36, and an open state in which no such recording or storage is permitted.

Figure 3:
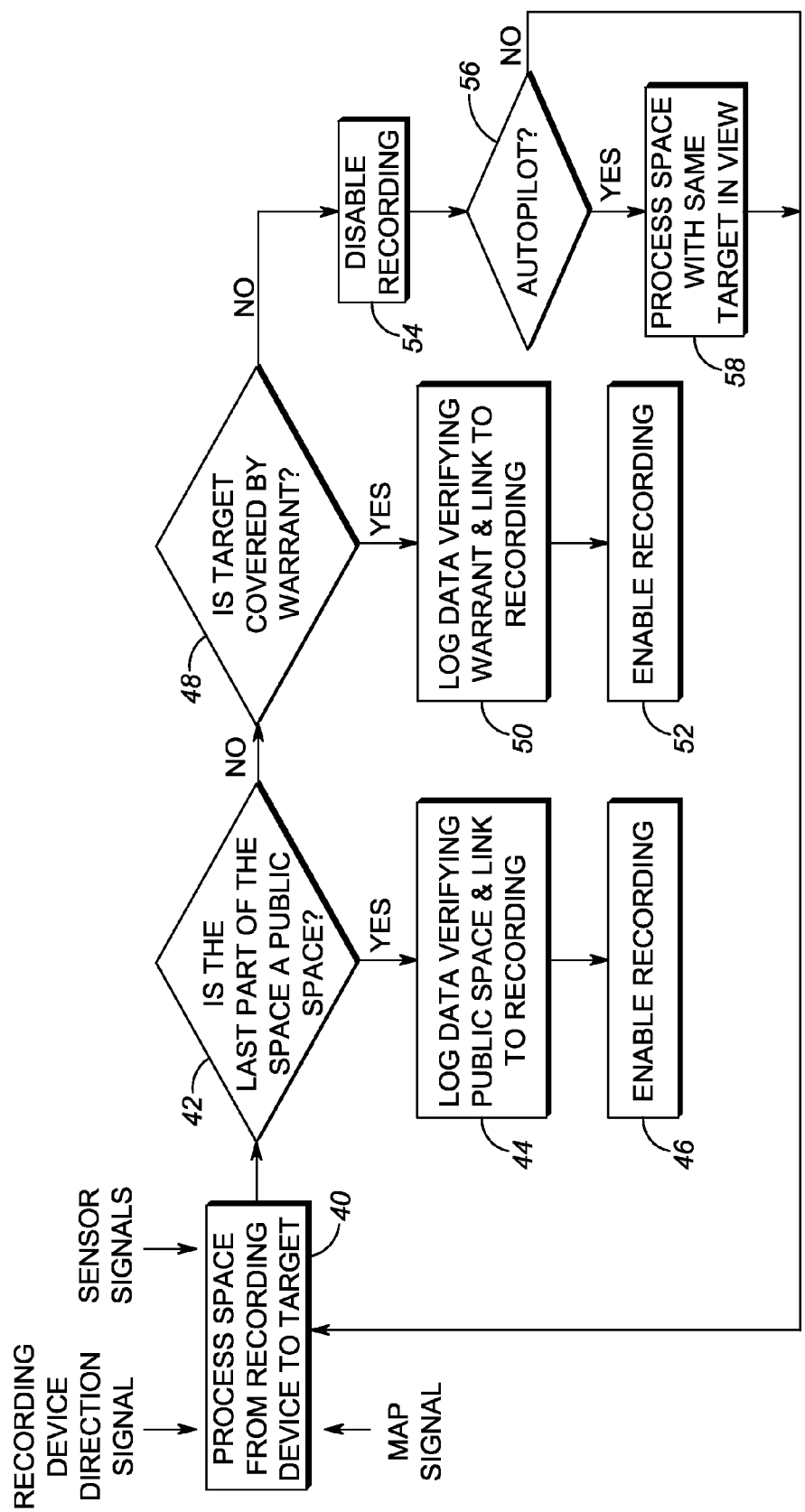
FIG. 3 is a flow chart, wherein steps of a method of conducting the surveillance with the system of FIG. 1 are set forth.

As shown in the flow chart of FIG. 3, the controller 30 processes the recording device direction signal from the device drive 26, the sensor signals from the sensors 32, and the map signal from the database 28, and determines, in step 40, which type of map space exists between the recording device 14 and the target 10, especially in the immediate vicinity of, or in close proximity to, the target 10. If a public space exists in the immediate vicinity of the target 10, as determined in the decision block 42, then the target 10 is deemed viewable/hearable/recordable from a public space, and the controller 30 logs or stores verification data verifying that the target 10 is so viewable/hearable/recordable in step 44, and recording of surveillance information is enabled and performed in step 46. If a public space did not exist in the immediate vicinity of the target 10, then the controller 30, in decision block 48, determines whether the target 10 is covered by a warrant space. If a warrant space covers the target 10, then the controller 30 logs or stores verification data verifying that the warrant space did indeed cover the target 10 in step 50, and recording of surveillance information is enabled and performed in step 52. If a warrant space did not cover the target 10, then the controller 30 automatically disables recording by the recording device 12 in step 54, thereby preventing an illegal recording from being performed and, in turn, complying with privacy rights.

In further accordance with this disclosure, the surveillance may be continued, even after the recording has been disabled in step 54, by steering the mobile support 12 by operation of the steering control 20, under the guidance of the autopilot 56, to move the mobile support 12 through the geographic area in step 58 to a position in which the target 10 is viewable/hearable/recordable from a public map space along the line-of-sight 18 between the recording device 14 and the target 10, especially in the immediate vicinity of, or in close proximity to, the target 10 along the line-of-sight 18, in which case, a recording is now legal and permitted. Thus, as illustrated in FIG. 1, the existence of a private map space in the immediate vicinity of the target 10 along the line-of-sight 18 disables any such illegal recording. However, after the mobile support 12 and/or its recording device 14 have been moved along the flight path 16 and re-positioned such that a public map space is now located in the immediate vicinity of the target 10 along the line-of-sight 18, a legal recording can now be performed.

As described herein, a surveillance complies with an individual's privacy rights when the target is viewable/hearable/recordable from a public map space, or is covered by a warrant space. In the event that laws and rules change, and in the event that specific jurisdictions may have other factors determining the legality of a surveillance, it will be understood that the method and system described herein can be modified to cover any such extra changes or factors, and that the present invention is intended to cover any such modifications.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A system for conducting surveillance of a target, the system comprising:
   a mobile support movable relative to the target over a geographic area;
   a recording device mounted on the support for recording surveillance information, and positioned to face the target along a line-of-sight during recording;
   a database for storing public map spaces and private map spaces that exist in the geographic area; and
   a programmed controller for accessing the database, for determining whether the target is viewable from a public map space along the line-of-sight between the recording device and the target by determining if any private space exists along the line-of-sight between the recording device and the target device, and for controlling the recording device to record the surveillance information upon a successful determination that the target is so recordable.

2. The system of claim 1, wherein the controller is also operative for automatically disabling the recording device upon an unsuccessful determination that the target is so recordable.

3. The system of claim 1, wherein the mobile support is one of a vehicle and a body harness.

4. The system of claim 1, wherein the recording device is one of a camera and a microphone.

5. The system of claim 1, wherein the database is also operative for storing warrant spaces that can be surveilled, and wherein the controller is also operative for determining whether a warrant space covers the target, and for controlling the recording device to record the surveillance information upon a successful determination that the target is so covered.

6. The system of claim 1, wherein the controller is also operative for storing verification data verifying that the target is recordable from a public map space along the line-of-sight between the recording device and the target during recording.

7. The system of claim 1, wherein the controller is also operative for storing the recorded surveillance information.

8. The system of claim 1, and a drive for moving the recording device relative to the mobile support to adjustably position the recording device to face the target, and for generating a direction signal for the controller.

9. The system of claim 1, and steering controls for steering the mobile support to move through the geographic area, and wherein the controller is also operative for controlling the steering controls to move the mobile support to a position in which the target is recordable from a public map space along the line-of-sight between the recording device and the target.

10. A system for conducting surveillance of a target, the system comprising:
a mobile support movable relative to the target over a geographic area;
a recording device mounted on the support for recording surveillance information;
a drive for moving the recording device relative to the mobile support to adjustably position the recording device to face the target along a line-of-sight during recording;
a database for storing public map spaces and private map spaces that exist in the geographic area, and for storing warrant spaces that can be surveilled; and
a programmed controller for accessing the database, for determining whether the target is recordable from a public map space along the line-of-sight between the recording device and the target by determining if any private space exists along the line-of-sight between the recording device and the target device, and for controlling the recording device to record the surveillance information upon a successful determination that the target is so recordable,
the controller being further operative for determining whether the target is covered by a warrant space, and for controlling the recording device to record the surveillance information upon a successful determination that the target is so covered, and
the controller being further operative for automatically disabling the recording device upon an unsuccessful determination that the target is so recordable or so covered.

11. A method of conducting surveillance of a target, the method comprising:
moving a mobile support relative to the target over a geographic area;
recording surveillance information with a recording device positioned to face the target along a line-of-sight during recording;
storing public map spaces and private map spaces that exist in the geographic area in a database;
determining whether the target is recordable from a public map space along the line-of-sight between the recording device and the target by accessing the database; and
controlling the recording device to record the surveillance information upon a successful determination that the target is so recordable.

12. The method of claim 11, and automatically disabling the recording device upon an unsuccessful determination that the target is so recordable.

13. The method of claim 11, and configuring the mobile support as one of a vehicle and a body harness.

14. The method of claim 11, and configuring the recording device as one of a camera and a microphone.

15. The method of claim 11, and storing warrant spaces that can be surveilled in the database, determining whether a warrant space covers the target, and controlling the recording device to record the surveillance information upon a successful determination that the target is so covered.

16. The method of claim 11, and storing verification data verifying that the target is recordable from a public map space along the line-of-sight between the recording device and the target during recording.

17. The method of claim 11, and storing the recorded surveillance information.

18. The method of claim 11, and moving the recording device relative to the mobile support to adjustably position the recording device to face the target along the line-of-sight during recording.

19. The method of claim 1, and steering the mobile support to move through the geographic area to a position in which the target is recordable from a public map space along the line-of-sight between the recording device and the target.

* * * * *